United States Patent
Ikram et al.

(10) Patent No.: US 8,374,285 B2
(45) Date of Patent: Feb. 12, 2013

(54) SYSTEM AND METHOD FOR TIME DOMAIN INTERPOLATION OF SIGNALS FOR CHANNEL ESTIMATION

(75) Inventors: Muhammad Zubair Ikram, Richardson, TX (US); Seok-Jun Lee, Allen, TX (US); Murtaza Ali, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1318 days.

(21) Appl. No.: 12/115,394

(22) Filed: May 5, 2008

(65) Prior Publication Data

US 2009/0274200 A1 Nov. 5, 2009

(51) Int. Cl.
H03K 9/00 (2006.01)
H04L 27/06 (2006.01)

(52) U.S. Cl. .................................... 375/316; 375/340

(58) Field of Classification Search .............. 375/216, 375/219, 316, 340; 708/313
See application file for complete search history.

(56) References Cited

U.S. PATENT DOCUMENTS

| 7,248,559 | B2 | 7/2007 | Ma et al. | |
|---|---|---|---|---|
| 2006/0133529 | A1* | 6/2006 | Lee et al. | 375/260 |
| 2007/0087749 | A1 | 4/2007 | Ionescu et al. | |
| 2007/0127582 | A1* | 6/2007 | Lee et al. | 375/260 |
| 2010/0002788 | A1* | 1/2010 | Wu et al. | 375/260 |
| 2010/0260248 | A1* | 10/2010 | Hung et al. | 375/224 |
| 2011/0129035 | A1* | 6/2011 | Liu et al. | 375/316 |

FOREIGN PATENT DOCUMENTS

WO  WO 2007/112489 A1  10/2007

OTHER PUBLICATIONS

Yushi et al., "WiMAX Channel Estimation: Algorithms and Implementations," Freescale Semiconductor, Draft Jul. 2007, pp. 1-16.*

* cited by examiner

*Primary Examiner* — Tesfaldet Bocure

(74) *Attorney, Agent, or Firm* — Steven A. Shaw; W. James Brady; Frederick J. Telecky, Jr.

(57) ABSTRACT

A system and method for time domain interpolation of signals for channel estimation. A method for computing channel estimates comprises storing symbols in a buffer, using time domain interpolation (TDI) for a first time to compute channel estimates for a set of sub-carriers of a symbol. The channel estimates are computed from the symbol and a first number of required symbols in the buffer. The method also comprises using TDI for a second time to compute channel estimates for the set of sub-carriers of a symbol. The channel estimates are computed from the symbol, a second number of required symbols in the buffer, and a buffered symbol used as a missing required symbol if the missing required symbol is not in the buffer.

21 Claims, 8 Drawing Sheets

SYSTEM AND METHOD FOR TIME DOMAIN INTERPOLATION OF SIGNALS FOR CHANNEL ESTIMATION

TECHNICAL FIELD

The present invention relates generally to a system and method for wireless communications, and more particularly to a system and method for time domain interpolation of signals for channel estimation.

BACKGROUND

A wireless communications channel may cause arbitrary time dispersion, attenuation, and phase shift in a received signal. Channel estimation may be used to form an estimate of the effects of the wireless communications channel from available training data transmitted over the wireless communications channel. Since the training data is known, the effects of the wireless communications channel on the training data may be determined and used to remove the effects of the wireless communications channel from the received signal.

Figure 1:
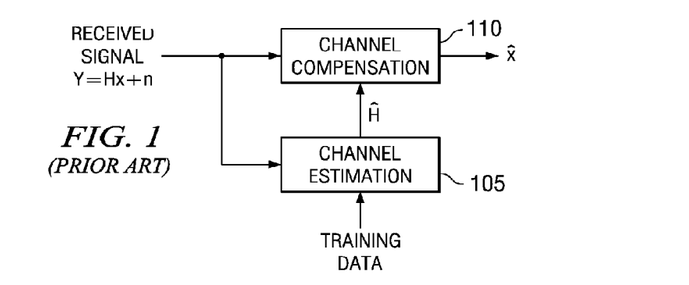
FIG. 1 is a diagram of a prior art technique of using channel estimation used to remove the effects of a wireless communications channel.

FIG. 1 illustrates a prior art technique of using channel estimation to remove the effects of the wireless communications channel on a received signal. A received signal at a receiver may be expressed as Y=Hx+n, where Y is the received signal, H is the wireless communications channel, x is the transmitted signal, and n is noise. A channel estimation unit 105 may process a received training signal, which is known at the receiver, to produce a model of the wireless communications channel, Ĥ. The model of the wireless communications channel, Ĥ, may be provided to a channel compensation unit 110, where it may be applied to the received signal, Y, to produce a recovered transmitted signal, x̂.

SUMMARY OF THE INVENTION

These and other problems are generally solved or circumvented, and technical advantages are generally achieved, by embodiments of a system and a method for time domain interpolation of signals for channel estimation.

In accordance with an embodiment, a method for computing channel estimates of a communications channel using time domain interpolation, wherein training data is transmitted over scattered sub-carriers, is provided. The method includes storing symbols received over the communications channel in a buffer, and using time domain interpolation to compute channel estimates for a set of sub-carriers of a symbol being processed for a first time. The sub-carriers are capable of containing training data for other symbols but do not contain training data for the symbol being processed. The time domain interpolation computes the channel estimates from the symbol being processed and a first number of required symbols, in response to determining that all of the required symbols are in the buffer. The method also includes using time domain interpolation to compute channel estimates for the set of sub-carriers of the symbol being processed for a second time. The time domain interpolation computes the channel estimates from the symbol being processed, a second number of buffered required symbols, and a buffered symbol used as a missing required symbol, in response to determining that the missing required symbol is not in the buffer.

In accordance with another embodiment, a method for communicating wirelessly is provided. The method includes buffering symbols received from a transmitter, computing channel estimates using the buffered symbols, recovering symbols from the buffered symbols using the channel estimates, and decoding data from the recovered symbols. The computing channel estimates includes computing channel estimates for a set of first sub-carriers in a symbol being processed with first sub-carriers containing training data, and using interpolation to compute channel estimates for sub-carriers in the symbol being processed not containing training data. The using interpolation includes using time domain interpolation to compute channel estimates for a set of second sub-carriers of the symbol being processed, and using frequency domain interpolation to compute channel estimates for a set of third sub-carriers in the symbol. The second sub-carriers are capable of containing training data for other symbols but do not contain training data for the symbol being processed and the third sub-carriers do not contain training data. The time domain interpolation uses the symbol being processed, buffered required symbols, and/or a buffered symbol used as a missing required symbol.

In accordance with another embodiment, a communications device is provided. The communications device includes a transmitter for transmitting data and training data over a number of sub-carriers, and a receiver for receiving transmitted data and training data. The receiver includes a receive filter that attenuates interferers, a channel estimator coupled to the receive filter, and a baseband processor coupled to the channel estimator. The channel estimator computes a channel estimate for a wireless communications channel using training data contained in the received transmitted training data and the baseband processor recovers the transmitted data from the received transmitted data using the channel estimate and decodes and filters the recovered transmitted data. The channel estimator includes a time domain interpolation unit coupled to a memory used to buffer received symbols, a frequency domain interpolation unit coupled to the memory, and a buffered symbol select unit coupled to the time domain interpolation unit. The time domain interpolation unit uses time domain interpolation to compute a channel estimate for sub-carriers of a symbol that are capable of containing training data but not containing training data, the frequency domain interpolation unit computes a channel estimate for sub-carriers of the symbol not capable of containing training data, and the buffered symbol select unit selects symbols from the memory, wherein the symbols are temporally close to the symbol.

An advantage of an embodiment is that little additional hardware is required. This may result in an integrated solution with small chip area and reduced power consumption.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a wireless receiver adherent to the Worldwide Interoperability for Microwave Access (WiMAX) technical standard. The invention may also be applied, however, to wireless communications protocols wherein training data is transmitted along with transmitted data, such as the $3^{rd}$ Generation Partnership Project (3GPP) Long Term Evolution (LTE) wireless communications protocol.

Channel estimation may occur several different ways. Training data may be transmitted by a transmitter to a receiver before or after transmitted data is transmitted to the receiver. This may allow for an estimation of the entire wireless communications channel without interfering with transmitted data. Alternatively, the training data may be transmitted along with the transmitted data. For example, in a WiMAX compliant wireless communications system, training data may be transmitted in scattered sub-carriers (pilots), interleaved with the transmitted data. To improve the channel estimation, the location of the scattered pilots may change from one symbol to the next. The scattered pilots may also be scattered in different patterns depending on permutation.

Figure 2A:
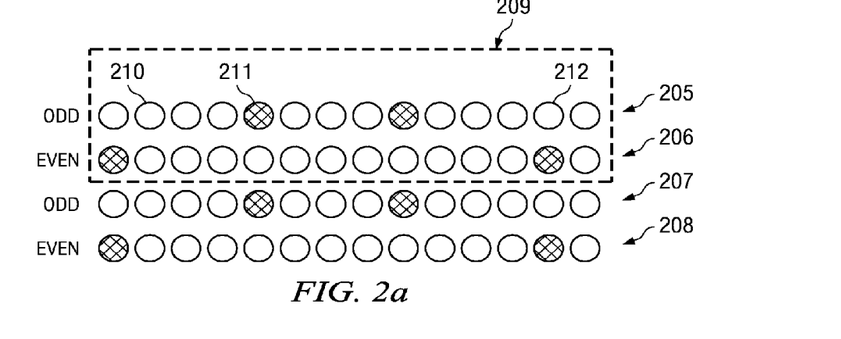
FIG. 2a is a diagram of a number of symbols in a WiMAX transmission, wherein the transmission utilizes a partially used sub-carrier (PUSC) permutation.

With reference now to FIG. 2a, there is shown a diagram illustrating a number of symbols in a WiMAX transmission, wherein the transmission utilizes a partially used sub-carrier (PUSC) permutation. The symbols in a WiMAX transmission may utilize orthogonal frequency division multiplexing (OFDM). The diagram illustrates the content of sub-carriers for a number of symbols, including a first odd symbol 205, a first even symbol 206, a second odd symbol 207, and a second even symbol 208. In the PUSC permutation, each cluster comprises 14 sub-carriers in the frequency domain and spans two symbols in the time domain, for example, cluster 209 includes the first odd symbol 205 and the first even symbol 206 in the time domain and spans 14 sub-carriers in the frequency domain. Each sub-carrier within the cluster, such as sub-carrier 210, may contain transmitted data (shown in FIG. 2a as hollow circles), while some sub-carriers, such as sub-carrier 211, may also contain training data (shown in FIG. 2a as cross-hatched circles). A sub-carrier containing training data may be referred to as a pilot. A pilot pattern may be repeated every other OFDM symbol. A sub-carrier capable of containing training data may contain training data in one symbol may not contain training data in another symbol. For example, sub-carrier 211 may contain training data in the first odd symbol 205 but may not contain training data in the first even symbol 206.

In the PUSC permutation, a sub-carrier capable of containing training data may contain training data in every other symbol. For example, the sub-carrier 211 may contain training data in the first odd symbol 205 and the second odd symbol 207, but in the first even symbol 206 and the second even symbol 208, it contains transmitted data. Similarly, a sub-carrier 212 may contain transmitted data in the first odd symbol 205 and the second odd symbol 207, but in the first even symbol 206 and the second even symbol 208, it contains training data.

Figure 2B:
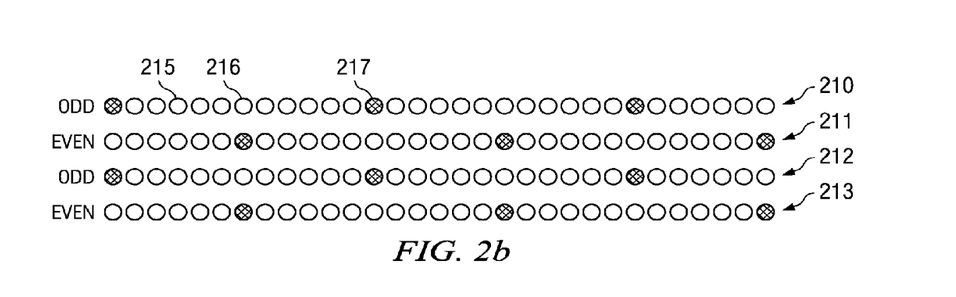
FIG. 2b is a diagram of a number of symbols in a WiMAX transmission, wherein the transmission utilizes a fully used sub-carrier (FUSC) permutation.

FIG. 2b illustrates a number of symbols in a WiMAX transmission, wherein the transmission utilizes a fully used sub-carrier (FUSC) permutation. The diagram illustrates the content of sub-carriers for a number of symbols, including a first odd symbol 210, a first even symbol 211, a second odd symbol 212, and a second even symbol 213. In the FUSC permutation, the pilot repeats every 12-th sub-carrier. Moreover, there is a six sub-carrier offset in the pilot location between odd and even symbols. Each sub-carrier, such as sub-carrier 215, may contain transmitted data, while some sub-carriers, such as sub-carrier 216 and sub-carrier 217, may also contain training data. In the FUSC permutation, a sub-carrier capable of containing training data may contain training data in every other symbol. For example, the sub-carrier 216 may contain training data in the first even symbol 211 and the second even symbol 213, but in the first odd symbol 210 and the second odd symbol 212, it contains transmitted data. Similarly, the sub-carrier 217 may contain training data in the first odd symbol 210 and the second odd symbol 212, but in the first even symbol 211 and the second even symbol 213, it contains transmitted data. A pilot pattern may be repeated every other OFDM symbol.

Figure 2C:
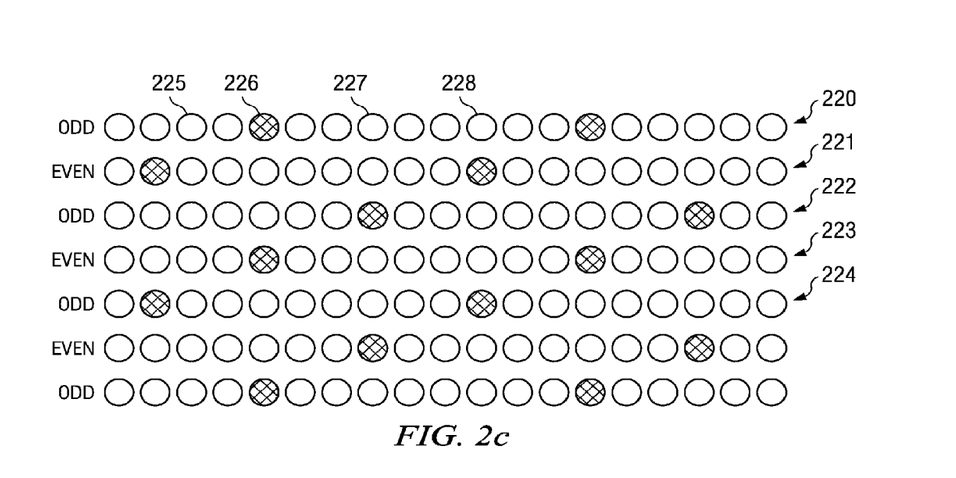
FIG. 2c is a diagram of a number of symbols in a WiMAX transmission, wherein the transmission utilizes an adaptive modulation and coding (AMC) permutation.

FIG. 2c illustrates a number of symbols in a WiMAX transmission, wherein the transmission utilizes an adaptive modulation and coding (AMC) permutation. The diagram illustrates the content of sub-carriers for a number of symbols, including a first odd symbol 220, a first even symbol 221, a second odd symbol 222, a second even symbol 223, and a third odd symbol 224. In the AMC permutation, the pilot repeats every 9-th sub-carrier. Moreover, there is a three sub-carrier offset in the pilot location between two consecutive symbols in time, i.e., a pilot pattern may be repeated every third OFDM symbol. Each sub-carrier, such as sub-carrier 225, may contain transmitted data, while some sub-carriers, such as sub-carrier 226, sub-carrier 227, and sub-carrier 228, may also contain training data. In the AMC permutation, a sub-carrier capable of containing training data may contain training data in every third symbol. For example, the sub-carrier 226 may contain training data in the first odd symbol 220 and the second even symbol 223, but in the first even symbol 221 and the second odd symbol 222, it contains transmitted data. Similarly, the sub-carrier 217 may contain training data in the second odd symbol 222, but in the first odd symbol 220, the first even symbol 221, the second even symbol 223, and the third odd symbol 224, it contains transmitted data. The sub-carrier 228 may contain training data in the first even symbol 221 and the third odd symbol 224, but in the first odd symbol 220, the second odd symbol 222, and the second even symbol 223, it contains transmitted data.

Figure 3:
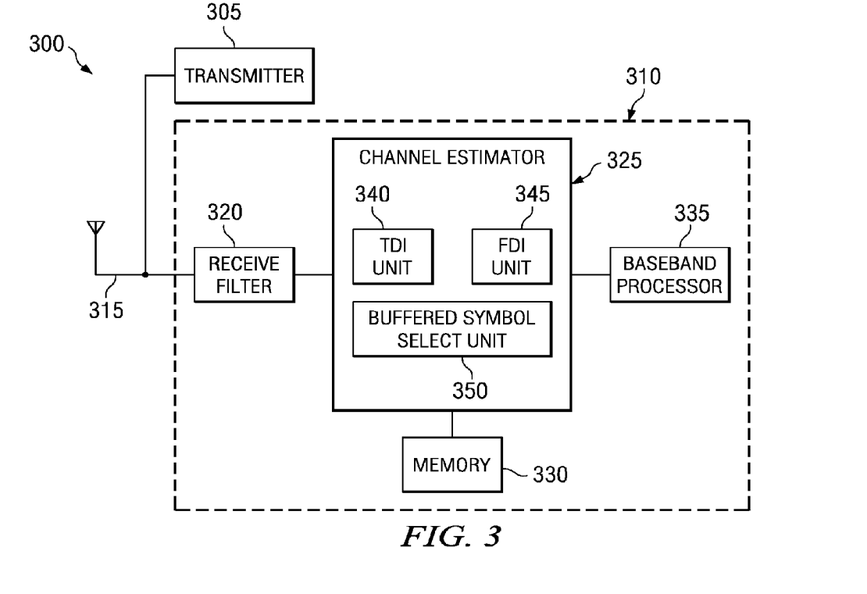
FIG. 3 is a diagram of a portion of a wireless communications device.

FIG. 3 illustrates a view of a portion of a wireless communications device 300. The wireless communications device 300 includes a transmitter 305 and a receiver 310. The transmitter 305 and the receiver 310 may share an antenna 315 or they each may have dedicated antennas. Although shown as a single antenna, the antenna 315 may comprise multiple antennas with the transmitter 305 and/or the receiver 310 using more than one antenna to transmit and/or receive multiple independent data streams. The wireless communications device 300 with the transmitter 305 and the receiver 310 using multiple antennas to transmit and/or receive multiple independent data streams may be referred to as a multiple input, multiple output (MIMO) wireless communications device 300.

The receiver 310 includes a receive filter 320 that may be used to filter the received signal and potentially eliminate (or attenuate) interferers and/or noise received along with the received signal. The receiver 310 also includes a channel estimator 325 to compute a channel estimate for the wireless communications channel and to use the channel estimate to recover the transmitted signal from the received signal. A memory 330 coupled to the channel estimator 325 may be used to store the channel estimate, received symbols, and so forth. A baseband processor 335 may be used to use the channel estimate to recover the transmitted signal from the received signal, perform signal decoding, error detection and correction, additional filtering, amplification, and other forms of signal processing on the received signal to produce data for use by the receiver 310 or other electronic devices attached to the receiver 310.

The channel estimator 325 includes a time domain interpolation (TDI) unit 340 for use in performing interpolation of the channel estimates of a sub-carrier between symbols in the time domain, a frequency domain interpolation (FDI) unit 345 for use in performing interpolation of the channel estimates between sub-carriers of a symbol in the frequency domain, and a buffered symbol select unit 350. The buffered symbol select unit 350 may be used to select received symbols that may be buffered in the memory 330 for use in TDI by the TDI unit 340. The buffered symbol select unit 350 may be used to select the symbols to be used in TDI based on the permutation used in the received transmission, and if needed symbols are not available, the buffered symbol select unit 350 may select buffered symbols to duplicate (replicate) to replace the unavailable symbols. A more detailed description of the operation of the buffered symbol select unit 350 is provided below.

If multiple antennas are used to transmit and receive multiple independent data streams, then the number of symbols that may need to be buffered in the memory 330 may need to be increased. However, the training data transmitted in sub-carriers (pilots) may be orthogonally multiplexed so that the training data may be applied to a single antenna at a time (i.e., a sub-carrier assigned as a pilot for one antenna may be transmitting null data for other antennas). This may increase the number of symbols at a receiver over which the pilots are repeated, thereby potentially increasing the symbol buffering requirement.

Figure 4:
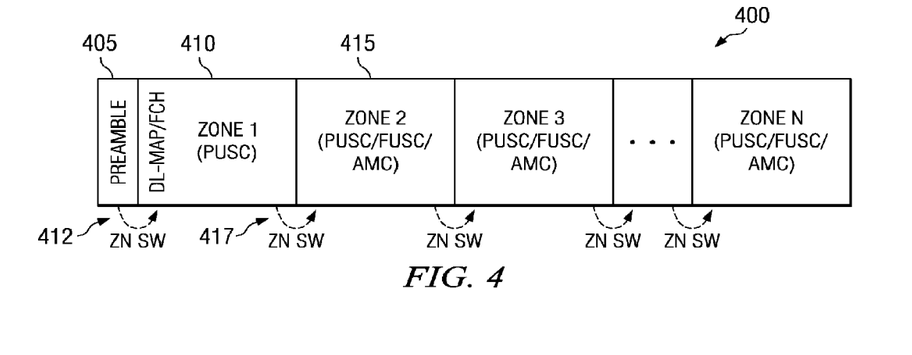
FIG. 4 is a diagram of a WiMAX frame.

FIG. 4 is a diagram of a WiMAX frame 400. A WiMAX frame may span across multiple permutation zones, with a zone being a sequence of symbols using a single permutation. The WiMAX frame 400 includes a preamble 405 and a first zone 410 that by definition must use the PUSC permutation. When there is a permutation change, there is a zone switch "ZN SW," such as a first zone switch 412 between the preamble 405 and the first zone 410. If there are no additional permutation changes, then a WiMAX frame will have only a single zone.

However, if there are subsequent permutation changes, then a WiMAX frame may have addition zones. Additional zones in a WiMAX frame may use the PUSC, the FUSC, or the AMC permutations. For example, a second zone 415 in the WiMAX frame 400 may use the PUSC, the FUSC, or the AMC permutations. However, if a zone uses the same permutation as an immediately preceding zone, then the two zones may be considered the same zone. A second zone switch 417 occurs between the first zone 410 and the second zone 415.

Figure 5A:
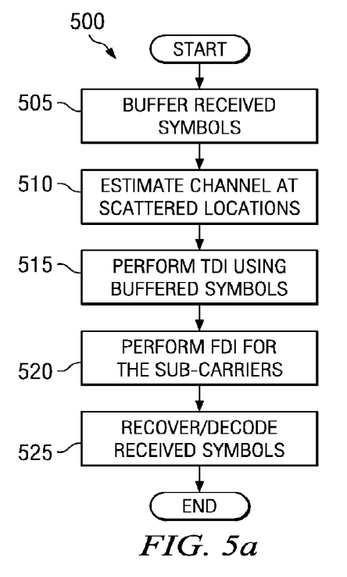
FIG. 5a is a diagram of a sequence of events in communicating over a wireless communications channel.

FIG. 5a illustrates a sequence of events 500 in communicating over a wireless communications channel, wherein the communications includes training data that is scattered over a range of pilots. The communications may occur continuously during normal operation of a wireless communications device since the training data is interleaved with transmitted data and scattered over a range of pilots.

The communications may begin with a buffering of received symbols (block 505). The number of received symbols to be buffered may depend upon several factors, including an allowable amount of latency, available memory for buffering, the permutation used in the transmissions, and so forth. For example, for PUSC and FUSC permutations wherein pilots are repeated every other symbol, a minimum number of symbols buffered may be three. However, for AMC permutations wherein pilots are repeated every third symbol, a minimum number of symbols buffered may be five.

Figure 6A:
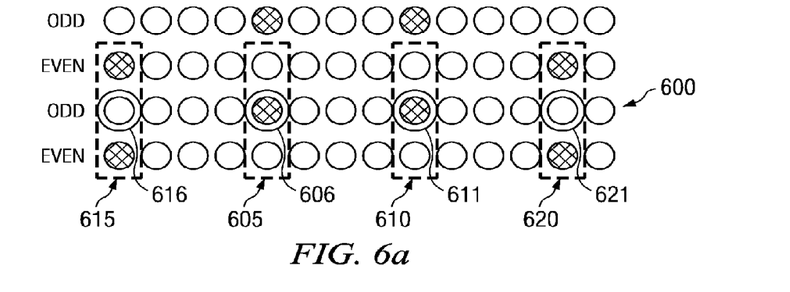
FIG. 6a is a diagram of several WiMAX symbols, highlighting the computing of channel estimates for a symbol.
Figure 6B:
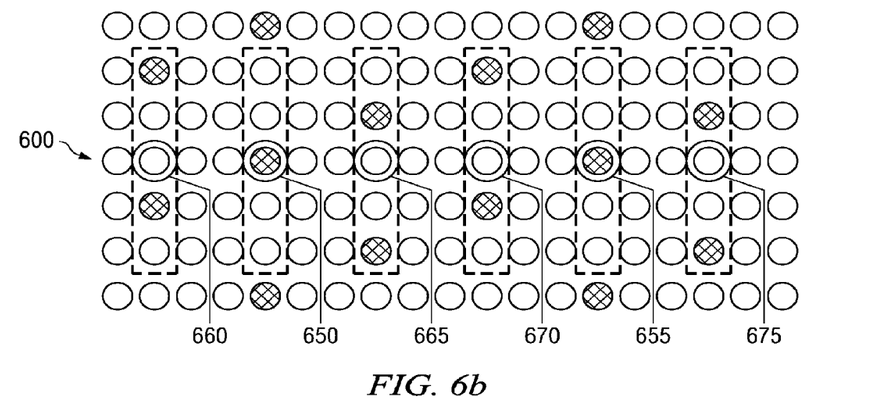
FIG. 6b is a diagram of several WiMAX symbols, highlighting the computing of channel estimates for a symbol.

As symbols are received, a channel estimate may be computed for the channel at sub-carriers corresponding to the scattered pilots containing training data (block 510). FIG. 6a is a diagram of a number of symbols in a WiMAX transmission, wherein the transmission utilizes the PUSC permutation. FIG. 6a highlights the computing of the channel estimate for symbol 600. Since the transmission uses the PUSC permutation, three symbols may be needed to compute channel estimates. Since the pilots contain actual training data, no interpolation, either time domain or frequency domain, is required. The computing of the channel estimate at the pilots may be expressed mathematically as:

$$\hat{H}_{k,l} = \frac{Y_{k,l}}{X_{k,l}},$$

where $Y_{k,l}$ is the received data at pilot location k,l and $X_{k,l}$ is the known training data for the pilot location k,l and k and l are integer values representing symbol and sub-carrier location, respectively. For example, in highlight 605 and highlight 610, for the symbol 600, sub-carriers 606 and 611 are pilots, therefore, channel estimates for the sub-carriers may be directly computed. However, in highlight 615 and highlight 620, sub-carriers 616 and 621 are not pilots, therefore, channel estimates for the sub-carriers may not be directly computed. Similarly, FIG. 6*b* is a diagram of a number of symbols in a WiMAX transmission, wherein the transmission uses the AMC permutation. Channel estimates for sub-carriers 650 and 655 may be computed directly since sub-carriers 650 and 655 are pilots, however, since sub-carriers 660, 665, 670, and 675 are not pilots, the channel estimates may not be directly computed.

Figure 7A:
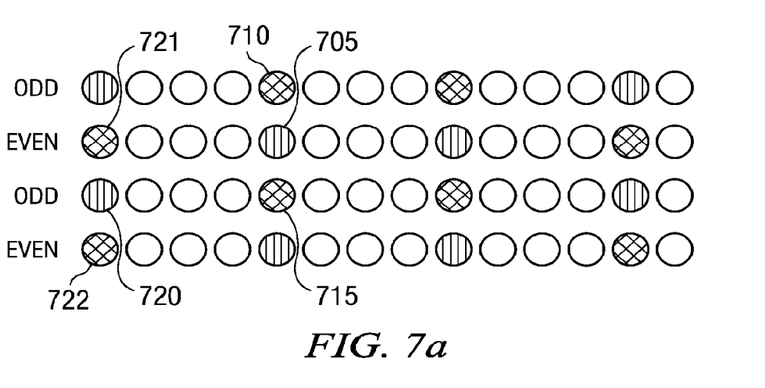
FIG. 7a is a diagram of several WiMAX symbols, highlighting time domain interpolation.

Turning back to FIG. 5*a*, after computing the channel estimate for sub-carriers at the scattered pilots, time domain interpolation may be performed using buffered symbols to compute channel estimates of sub-carriers carrying both training data and transmitted data (block 515). Time domain interpolation may involve the computation of channel estimates for sub-carriers that are used to carry transmitted data but may also be used to carry training data (i.e., the sub-carriers that in one symbol may carry transmitted data but in another symbol may be a pilot). Time domain interpolation uses sub-carriers and pilots from different symbols. FIG. 7*a* is a diagram of a number of symbols in a WiMAX transmission, wherein the transmission utilizes the PUSC permutation. For example, time domain interpolation may be used to compute a channel estimate for sub-carrier 705, which in a preceding symbol was a pilot (pilot 710) and in a succeeding symbol will be a pilot (pilot 715). The computing of the channel estimate for sub-carrier 705 may use channel estimates from the pilot 710 and the pilot 715. Similarly, for the following symbol, time domain interpolation may be used to compute a channel estimate for sub-carrier 720, which in a preceding symbol was a pilot (pilot 721) and in a succeeding symbol will be a pilot (pilot 722). Channel estimates of sub-carriers computed using time domain interpolation are shown in FIG. 7*a* as circles hatched with vertical lines, such as sub-carrier 705 and sub-carrier 720.

Figure 7B:
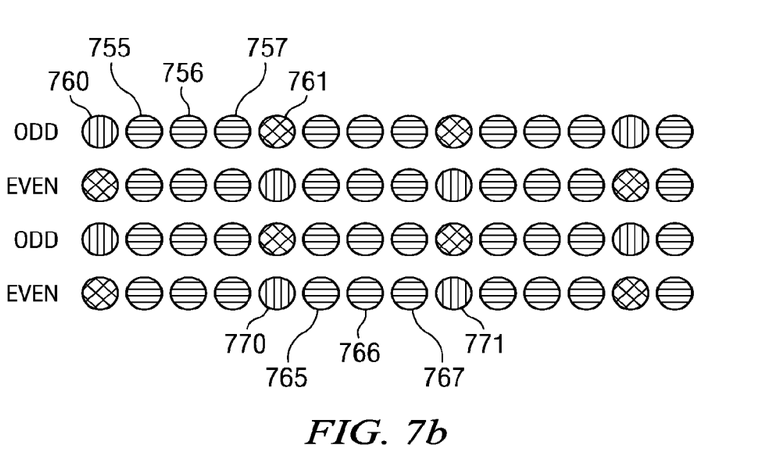
FIG. 7b is a diagram of several WiMAX symbols, highlighting frequency domain interpolation.

Turning back to FIG. 5*a*, after performing the time domain interpolation, frequency domain interpolation may be performed to compute channel estimates of sub-carriers carrying only transmitted data (block 520). Frequency domain interpolation may involve the computation of channel estimates for sub-carriers of a symbol that are used to carry transmitted data using channel estimates from pilots and the channel estimates from the time domain interpolation. FIG. 7*b* is a diagram of a number of symbols in a WiMAX transmission, wherein the transmission utilizes the PUSC permutation. For example, frequency domain interpolation may be used to compute channel estimates for sub-carriers 755, 756, and 757 (as well as other sub-carriers in the symbol not already having a channel estimate) using channel estimates from sub-carriers 760 and 761. The channel estimate for sub-carrier 760 was obtained previously using time domain interpolation, while sub-carrier 761 is a pilot. Similarly, frequency domain interpolation may be used to compute channel estimates for sub-carriers 765, 766, and 767 (as well as other sub-carriers in the symbol not already having a channel estimate) using channel estimates from sub-carriers 770 and 771. The channel estimates for sub-carriers 770 and 771 were obtained previously using time domain interpolation. Channel estimates for sub-carriers computed using frequency domain interpolation are shown in FIG. 7*b* as circles hatched with horizontal lines, such as sub-carrier 755 and sub-carrier 765.

Turning back now to FIG. 5*a*, after the time domain interpolation and the frequency domain interpolation completes (blocks 515 and 520), the channel estimation may be used to recover the received symbols and the received symbols may be decoded to recover transmitted data (block 525). The communications may continue as long as symbols continue to be received.

Figure 5B:
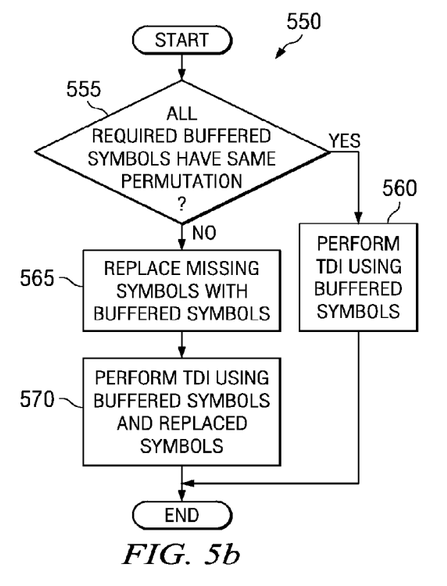
FIG. 5b is a diagram of a sequence of events in the time domain interpolation of channel estimates.

FIG. 5*b* illustrates a sequence of events 550 in the time domain interpolation of channel estimates, wherein training data is scattered over a range of pilots. As discussed previously, time domain interpolation may require the buffering of several symbols, with the number of symbols required varying depending on the permutation. For example, in a simple configuration, for PUSC and FUSC, a required minimum number of symbols to be buffered is three: the symbol that time domain interpolation is computing channel estimates for (i.e., the symbol being processed), a symbol immediately preceding the symbol being processed, and a symbol immediately succeeding the symbol being processed. For AMC, a required minimum number of symbols to be buffered is five: the symbol that time domain interpolation is computing channel estimates for, two symbols immediately preceding the symbol being processed, and two symbols immediately succeeding the symbol being processed. For other permutations and other configurations of pilots, a different number of symbols may need to be buffered. Furthermore, time domain interpolation may utilize more than a required minimum number of symbols to achieve channel estimates of potentially higher quality, for example.

Figure 8:
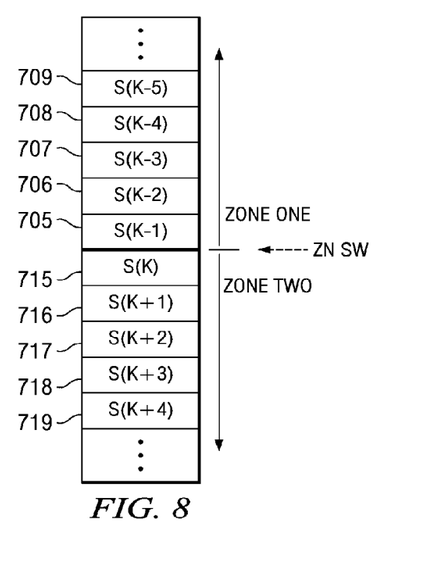
FIG. 8 is a diagram of a sequence of WiMAX symbols near a zone switch.

Since time domain interpolation computes channel estimates using multiple symbols, problems may arise at a zone switch, where the time domain interpolation of a symbol may not correctly produce a desired result since available symbols may have different permutations. FIG. 8 illustrates a view of symbols in a WiMAX frame near or at a zone switch, wherein symbols S(K−1) 705, S(K−2) 706, S(K−3) 707, S(K−4) 708, and S(K−5) 709 are symbols belonging to a first zone "zone one," while symbols S(K) 715, S(K+1) 716, S(K+2) 717, S(K+3) 718, and S(K+4) 719 belong to a second zone "zone two." Since symbols S(K−1) 705 to S(K−5) 709 and symbols S(K) to S(K+4) belong to different zones, they have different permutations. Therefore, if time domain interpolation attempts to compute channel estimates of symbols near or at the zone switch, then the time domain interpolation may be incorrect since pilots of symbols having different permutations may not be at expected locations, or different training data may be utilized.

For example, time domain interpolation of a channel estimate for sub-carriers in the symbol S(K−1) 705, wherein the first zone used FUSC permutation may require the use of three symbols: the symbol S(K−1) 705; a symbol immediately preceding the symbol S(K−1) 705, S(K−2) 706; and a symbol immediately succeeding the symbol S(K−1) 705, S(K) 715. However, the symbol S(K) 715 belongs to the second zone and uses a different permutation. Therefore, the use of the symbol S(K) 715 may result in an inaccurate channel estimate.

Turning back to FIG. 5b, after buffering all required symbols, the time domain interpolation of channel estimates for the symbol being processed may begin with a check to determine if all buffered symbols have the same permutation (block 555). If all of the buffered symbols have the same permutation, then time domain interpolation may be used to compute channel estimates for the symbol being processed (block 560). Zone information is available in the DL-MAP, which is transmitted following the preamble in the WiMAX frame (as shown in FIG. 4).

However, if not all of the buffered symbols have the same permutation (block 555), then some of the buffered symbols may not be usable and it may be necessary to replace some of the buffered symbols with a replacement symbol(s) (block 565). The replacement symbol(s) used to replace some of the buffered symbols may have the following desired characteristics: the replacement symbol(s) may be temporally close to the symbol being processed to help minimize the effect of changes in the communications channel, the replacement symbol(s) may have the same permutation as the symbol being processed, if more than one replacement symbols are used, then a different symbol may be used for each replacement symbol, the replacement symbol may have the same pilot arrangement as the symbol being replaced, and so forth. A detailed discussion of the replacement of buffered symbols with a replacement symbol(s) is provided below. Once the buffered symbols have been replaced, the time domain interpolation of channel estimates for the symbol being processed may be computed (block 570).

Figure 5C:
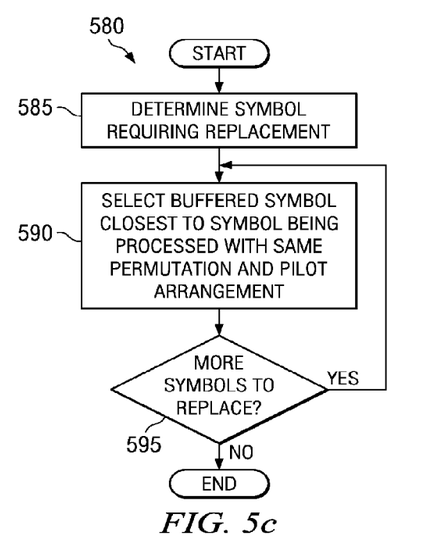
FIG. 5c is a diagram of a sequence of events in selecting a replacement symbol.

FIG. 5c illustrates a sequence of events 580 for use in selecting a replacement symbol. The selection of the replacement symbol may need to meet the above listed criteria in order to ensure that the channel estimate(s) computed using time domain interpolation provides a usable result. The selecting of the replacement symbol may begin with a determination of a symbol that requires replacement (block 585). In general, a symbol may require replacement if (1) it is needed in computing the time-domain interpolated channel estimates of the symbol being processed and (2) it has a different permutation from the symbol being processed. After determining the symbol requiring replacement, a buffered symbol having the same permutation as well as pilot locations as the symbol requiring replacement (and also the symbol being processed) that is closest (temporally) to the symbol being processed may be selected as the replacement symbol (block 590). The replacement symbol may be temporally close to the symbol being processed to help minimize time dependent behavior that may be present in the wireless communications channel. If there are any additional symbols requiring replacement, the selecting of a replacement symbol may be repeated (block 595). The selecting of replacement symbols for situations wherein there are multiple symbols requiring replacement may take place one symbol at a time or in parallel.

As discussed previously, the use of time domain interpolation to compute channel estimates for the symbol being processed may require the replacement of a buffered symbol(s) with a replacement symbol(s) when the symbol being processed is near or at a zone switch. The selection of replacement symbols, the number of replacement symbols used, and so forth may be based on the permutation and location of the symbol being processed.

Figure 9A:
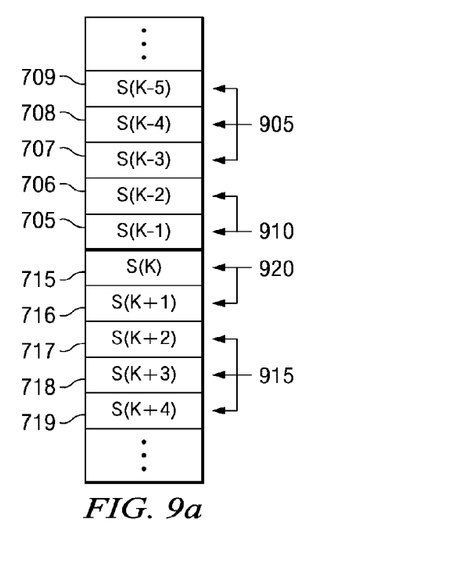
FIGS. 9a through 9c are diagrams of sequences of WiMAX symbols near a zone switch, highlighting different symbol combinations for computing channel estimates using time domain interpolation.

FIG. 9a illustrates a view of symbols in a WiMAX frame near or at a zone switch, wherein symbols in a first zone (symbols S(K−1) 705 to S(K−5) 709) use either the PUSC or FUSC permutation and symbols in a second zone (symbols S(K) 715 to S(K+4) 719) use either the FUSC or PUSC permutation. Since PUSC or FUSC is being used, three symbols need to be buffered for the computing of a channel estimate using time domain interpolation. When all three symbols share a common permutation, such as the symbol S(K−4) 708, S(K−5) 709, and S(K−3) 707, shown as span 905, the use of time domain interpolation to compute the channel estimate for the symbol S(K−4) 708 may be expressed as:

$$h(k-4)=f(h(k-5),h(k-4),h(k-3)),$$

where h(k−4) is the channel estimate for symbol S(K−4), and f( ) is the time domain interpolation.

However, for a symbol at a boundary of a zone, such as the symbol S(K−1) 705, the computation of the channel estimate using time domain interpolation may require the symbols S(K−2) 706 and S(K) 715. Unfortunately, the symbol S(K) 715 is in a different zone and therefore has a different permutation. A replacement symbol may be needed to replace the symbol S(K) 715 in the computation of the channel estimate for the symbol S(K−1) 705.

As discussed previously, the replacement symbol may be temporally close to the symbol being processed to help minimize the effect of changes in the communications channel, the replacement symbol(s) may have the same permutation as the symbol being processed, if more than one replacement symbols are used, then a different symbol may be used for each replacement symbol, the replacement symbol may have the same pilot arrangement as the symbol being replaced, and so forth. Using these criteria, the symbol S(K−2) 706 may be used as the replacement symbol for the symbol S(K) 715 (shown as span 920). The use of time domain interpolation to compute the channel estimate for the symbol S(K−1) 705 (shown as span 910) may be expressed as:

$$h(k-1)=f(h(k-2),h(k-1),h(k-2)).$$

Similarly, when all three symbols in the second zone share a common permutation, such as the symbol S(K+2) 717, S(K+3) 718, and S(K+4) 719, shown as span 915, the use of time domain interpolation to compute the channel estimate for the symbol S(K+3) may be expressed as:

$$h(k+3)=f(h(k+2),h(k+3),h(k+4)),$$

while the use of time domain interpolation to compute the channel estimate for the symbol S(K) may require the use of a replacement symbol for the symbol S(K−1) 705, which belongs in the first zone, may be expressed as:

$$h(k)=f(h+1),h(k),h(k+1)).$$

Figure 9B:
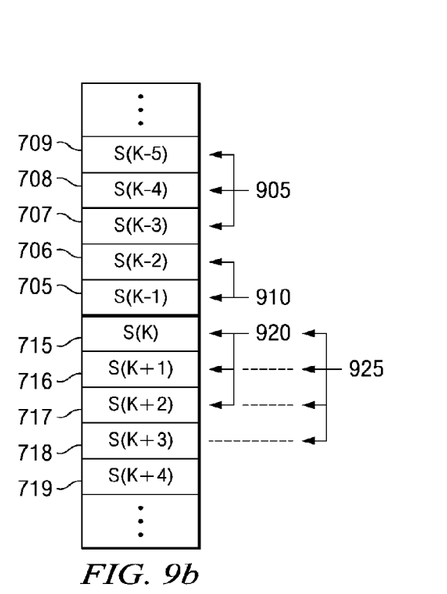

FIG. 9b illustrates a view of symbols in a WiMAX frame near or at a zone switch, wherein symbols in a first zone (symbols S(K−1) 705 to S(K−5) 709) use either the PUSC or FUSC permutation and symbols in a second zone (symbols S(K) 715 to S(K+4) 719) use the AMC permutation. The computation of channel estimates for symbols in the first zone (symbols S(K−1) 705 to S(K−5) 709) may proceed as described in FIG. 9a.

When AMC is being used, five symbols need to be buffered for the computing of a channel estimate using time domain interpolation. When all five symbols share a common permutation, such as symbol S(K) 715, S(K+1) 716, S(K+2) 717, S(K+3) 718, and S(K+4) 719, the use of time domain interpolation to compute the channel estimate for the symbol S(K+2) 717 may be expressed as:

$$h(k+2)=f(h(k),h(k+1),h(k+2),h(k+3),h(k+4)).$$

However, for symbols at a boundary of a zone, such as the symbol S(K) 715 and the symbol S(K+1) 716, the computation of the channel estimate using time domain interpolation may require the use of replacement symbols since at least one of the symbols required in time domain interpolation belongs in the first zone. For the computation of the channel estimate of the symbol S(K) 715, two replacement symbols are needed to replace symbols S(K−1) 705 and S(K−2) 706, and for the computation of the channel estimate of the symbol S(K+1) 716, one replacement symbol is needed to replace symbol S(K−1) 705. Using the previously discussed replacement symbol criteria for the symbol S(K) 715, the replacement symbols may be the symbol S(K+2) 717 to replace the symbol S(K−1) 705 and the symbol S(K+1) 716 to replace the symbol S(K−2) 706, while for the symbol S(K+1) 716, the replacement symbol may be the symbol S(K+2) 717 to replace the symbol S(K−1) 705. The use of time domain interpolation to compute the channel estimate for the symbols S(K) 715 (shown as span 920) and the symbol S(K+1) 716 (shown as span 925) may be expressed as:

$$h(k)=f(h(k+1),h(k+2),h(k),h(k+1),h(k+2)) \text{ and}$$

$$h(k+1)=f(h(k+2),h(k),h(k+1),h(k+2),h(k+3)).$$

Figure 9C:
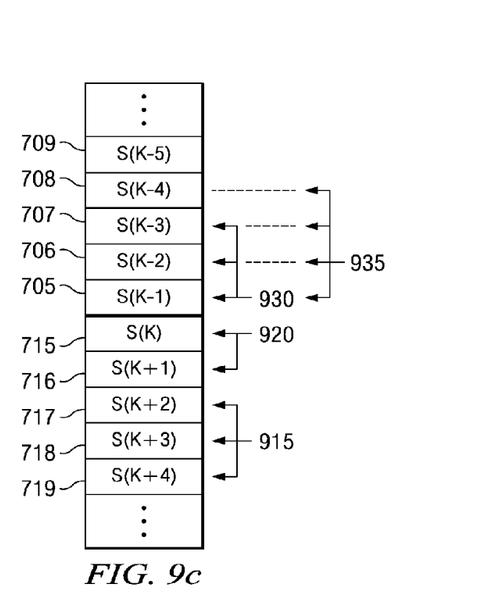

FIG. 9c illustrates a view of symbols in a WiMAX frame near or at a zone switch, wherein symbols in a first zone (symbols S(K−1) 705 to S(K−5) 709) use the AMC permutation and symbols in a second zone (symbols S(K) 715 to S(K+4) 719) use either the PUSC or FUSC permutation. The computation of channel estimates for symbols in the first zone (symbols S(K−1) 705 to S(K−5) 709) may proceed as described in FIG. 9b. With the computation of channel estimate for the symbol S(K−1) 705, shown as span 930, being similar to the computation of the channel estimate for the symbol S(K) 715 (span 920) shown in FIG. 9b, and the computation of the channel estimate for the symbol S(K−2) 706, shown as span 935, being similar to the computation of the channel estimate for the symbol S(K+1) 925 shown in FIG. 9b. The computation of channel estimates for symbols in the second zone (symbols S(K) 715 to S(K+4) 719) may proceed as described in FIG. 9a.

Figure 10A:
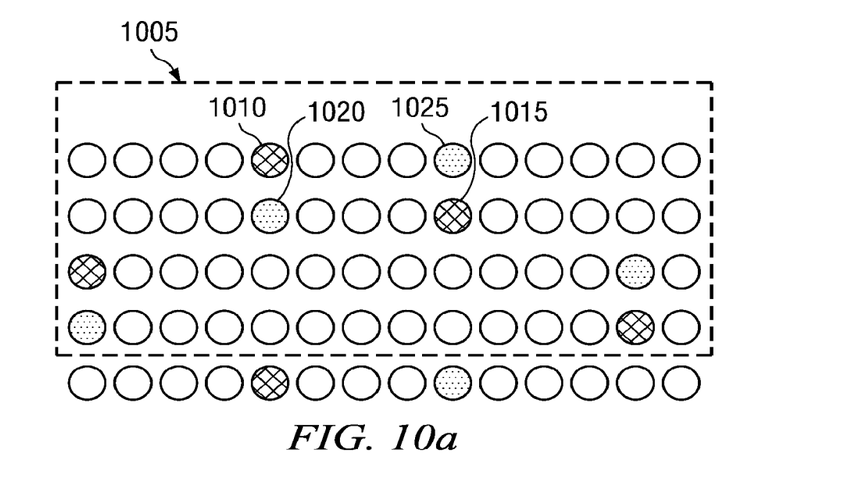
FIGS. 10a and 10b are diagrams of WiMAX symbols transmitted in a WiMAX system using PUSC permutation and two transmit antennas.
Figure 10B:
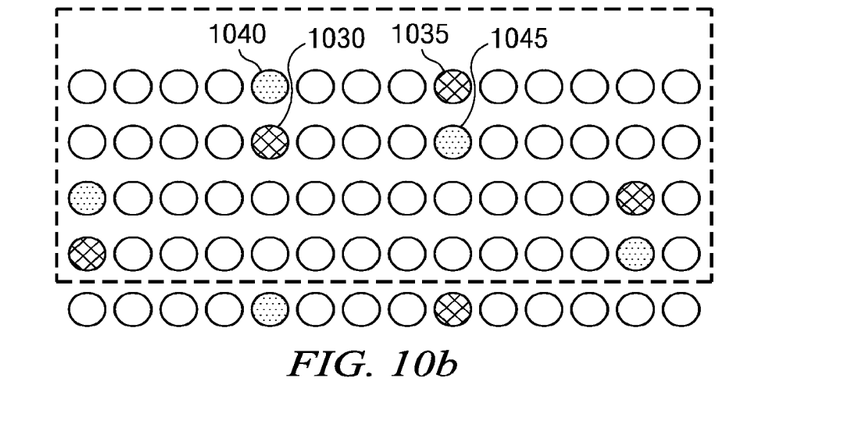

FIGS. 10a and 10b illustrate views of symbols in a WiMAX transmission, wherein the WiMAX transmission is from a 2×2 MIMO system utilizing the PUSC permutation. In a 2×2 MIMO system, two transmit antennas may be used to transmit two independent data streams. FIG. 10a illustrates a view of symbols from a first transmit antenna and FIG. 10b illustrates a view of symbols from a second transmit antenna. Since there are two independent data streams, clusters, such as cluster 1005, may contain four symbols (two symbols from each independent data stream). As shown in FIG. 10a, pilots, such as pilot 1010 and pilot 1015, may be used at a receive antenna to estimate the communications channel from the first transmit antenna to the receiver, while pilots, such as pilot 1020 and pilot 1025, may not be used and null data may be transmitted in their place. Similarly, as shown in FIG. 10b, pilots, such as pilot 1030 and pilot 1035, may be used at a receive antenna to estimate the communications channel from the second transmit antenna to the receiver, while pilots, such as pilot 1040 and pilot 1045, may not be used and null data may be transmitted in their place.

Figure 11A:
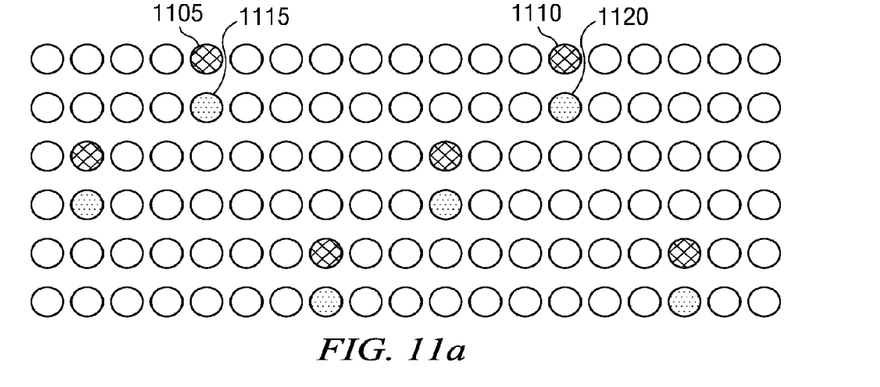
FIGS. 11a and 11b are diagrams of WiMAX symbols transmitted in a WiMAX system using AMC permutation and two transmit antennas.
Figure 11B:
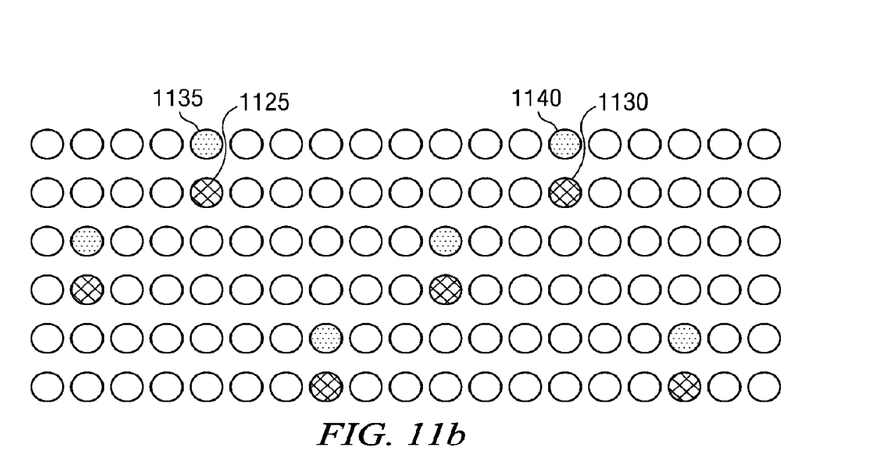

FIGS. 11a and 11b illustrate views of symbols in a WiMAX transmission, wherein the WiMAX transmission is from a 2×2 MIMO system utilizing the AMC permutation. FIG. 11a illustrates a view of symbols from a first transmit antenna and FIG. 11b illustrates a view of symbols from a second transmit antenna. As shown in FIG. 11a, pilots, such as pilot 1105 and pilot 1110, may be used at a receive antenna to estimate the communications channel from the first transmit antenna to the receiver, while pilots, such as pilot 1115 and pilot 1120, may not be used and null data may be transmitted. Similarly, as shown in FIG. 11b, pilots, such as pilot 1125 and pilot 1130, may be used at a receive antenna to estimate the communications channel from the second transmit antenna to the receiver, while pilots, such as pilot 1135 and pilot 1140, may not be used and null data may be transmitted.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for computing channel estimates of a communications channel using time domain interpolation, wherein training data is transmitted over scattered sub-carriers, the method comprising:
    storing symbols received over the communications channel in a buffer;
    using time domain interpolation a first time to compute channel estimates for a set of sub-carriers of a symbol being processed, wherein the sub-carriers are capable of containing training data for other symbols but do not contain training data for the symbol being processed, wherein the time domain interpolation computes the channel estimates from the symbol being processed and a first number of required symbols, in response to determining that all of the required symbols are in the buffer; and
    using time domain interpolation a second time to compute channel estimates for the set of sub-carriers of the symbol being processed, wherein the time domain interpolation computes the channel estimates from the symbol being processed, a second number of buffered required symbols, and a buffered symbol used as a missing required symbol, in response to a determining that the missing required symbol is not in the buffer.

2. The method of claim 1, further comprising, before using time domain interpolation for the second time, selecting the buffered symbol from the buffer to replace the missing required symbol.

3. The method of claim 2, wherein selecting the buffered symbol from the buffer comprises choosing a symbol from the buffer having substantially the same sub-carrier and training data configuration as the missing required symbol.

4. The method of claim 3, wherein selecting the buffered symbol from the buffer further comprises choosing a symbol from the buffer closest in time to the symbol being processed in response to determining that more than one symbol from the buffer has substantially the same sub-carrier and training data configuration as the missing required symbol.

5. The method of claim 2, wherein there are multiple missing required symbols, and wherein selecting the buffered symbol comprises choosing a different buffered symbol for each missing required symbol.

6. The method of claim 1, wherein the first number of required symbols is based on a sub-carrier and training data configuration used in the symbols received over the communications channel.

7. The method of claim 1, wherein the symbol being processed is also stored in the buffer.

8. The method of claim 1, wherein using time domain interpolation for the first time comprises using training data from the set of sub-carriers in the required symbols to compute channel estimates for sub-carriers in the set of sub-carriers in the symbol being processed.

9. The method of claim 1, wherein using time domain interpolation for the second time comprises using training data from the set of sub-carriers in the required symbols and the buffered symbol used as the missing required symbol to compute channel estimates for sub-carriers in the set of sub-carriers in the symbol being processed.

10. The method of claim 1 further comprising after using time domain interpolation for the second time:
selecting a new symbol being processed; and
repeating the storing, using time domain interpolation for the first time, and using time domain interpolation for the second time for the new symbol being processed.

11. The method of claim 1, wherein the first number of required symbols or the second number of buffered symbols plus the missing required symbol is greater than a minimum required number of symbols needed in time domain interpolation.

12. A method for communicating wirelessly, the method comprising:
buffering symbols received from a transmitter;
computing channel estimates using the buffered symbols, wherein computing channel estimates comprises:
computing channel estimates for a set of first sub-carriers in a symbol being processed, wherein first sub-carriers contain training data, and
using interpolation to compute channel estimates for sub-carriers in the symbol being processed not containing training data, wherein using interpolation comprises:
using time domain interpolation to compute channel estimates for a set of second sub-carriers of the symbol being processed, wherein the second sub-carriers are capable of containing training data for other symbols but do not contain training data for the symbol being processed, wherein the time domain interpolation uses the symbol being processed, buffered required symbols, and
using frequency domain interpolation to compute channel estimates for a set of third sub-carriers in the symbol, wherein the third sub-carriers do not contain training data;
recovering symbols from the buffered symbols using the channel estimates; and
decoding data from the recovered symbols.

13. The method of claim 12, wherein using time domain interpolation comprises:
using time domain interpolation to compute channel estimates for the set of second sub-carriers of the symbol being processed, wherein the time domain interpolation uses the symbol being processed and a number of buffered symbols temporally adjacent to the symbol being processed in response to a determining that the symbol being processed and the number of buffered symbols have the same sub-carrier and training data configuration; and
using time domain interpolation to compute channel estimates for the set of second sub-carriers of the symbol being processed, wherein the time domain interpolation uses the symbol being processed, a number of buffered symbols temporally adjacent to the symbol being processed, and a buffered symbol in response to a determining the symbol being processed, the number of buffered symbols, and the buffered symbol have the same sub-carrier and training data configuration and that the number of buffered symbols is less than a number of symbols required to perform time domain interpolation.

14. The method of claim 13, wherein the time domain interpolation additionally uses a buffered symbol as a missing required symbol, wherein a missing symbol is a symbol required for time domain interpolation but which has not been buffered, wherein the buffered symbol is selected from the buffered symbols received from the transmitter, and wherein the buffered symbol is closest temporally to the symbol being processed having the same sub-carrier and training data configuration as the missing symbol.

15. The method of claim 14, wherein there is more than one missing symbol, and wherein a different buffered symbol is selected for each missing symbol.

16. The method of claim 12, wherein computing channel estimates for the set of first sub-carriers may be expressed as:

$$\hat{H}_{k,l} = \frac{Y_{k,l}}{X_{k,l}},$$

where $\hat{H}_{k,l}$ is the channel estimate for a first sub-carrier location k,l and $Y_{k,l}$ is the training data at sub-carrier location k,l and $X_{k,l}$ is the known training data for the pilot location k,l and k and l are integer values.

17. A communications device comprising:
a transmitter for transmitting data and training data over a number of sub-carriers;
a receiver for receiving transmitted data and training data, the receiver comprising:
a receive filter configured to attenuate interferers;
a channel estimator coupled to the receive filter, the channel estimator configured to compute a channel estimate for a wireless communications channel using training data contained in the received transmitted training data, the channel estimator comprising:
a time domain interpolation unit coupled to a memory used to buffer received symbols, the time domain interpolation unit configured to use time domain interpolation to compute a channel estimate for sub-carriers of a symbol that are capable of containing training data but not containing training data;
a frequency domain interpolation unit coupled to the memory, the frequency domain interpolation unit configured to compute a channel estimate for sub-carriers of the symbol not capable of containing training data;
a buffered symbol select unit coupled to the time domain interpolation unit, the buffered symbol select unit configured to select symbols from the memory, wherein the symbols are temporally close to the symbol; and a baseband processor coupled to the channel estimator, the baseband processor configured to recover the transmitted data from the received transmitted data using the channel estimates from both the time domain interpolation and frequency domain interpolation, the baseband processor also configured to decode the recovered transmitted data.

18. The communications device of claim 17, wherein the buffered symbol select unit is configured to select buffered symbols having the same training data and sub-carrier configuration as the symbol.

19. The communications device of claim 18, wherein the buffered symbol select unit is further configured to select symbols buffered in the memory to replace symbols that are temporally close to the symbol but are not in the memory.

20. The communications device of claim 19, wherein the selected symbols buffered in the memory have the same training data and sub-carrier configuration as the symbols that are not in the memory.

21. The communications device of claim 17, wherein the communications device includes multiple transmit antenna and multiple receive antennas, and wherein the training data are orthogonally multiplexed.

* * * * *